United States Patent [19]

Carome

[11] Patent Number: 4,829,821

[45] Date of Patent: * May 16, 1989

[54] OPTICAL FIBER ACCELEROMETER

[76] Inventor: Edward F. Carome, 20301 Shelburne Rd., Suite 8, Shaker Hts., Ohio 44118

[*] Notice: The portion of the term of this patent subsequent to Jun. 9, 2004 has been disclaimed.

[21] Appl. No.: 35,666

[22] Filed: Apr. 8, 1987

Related U.S. Application Data

[63] Continuation-in-part of Ser. No. 467,264, Feb. 17, 1983, Pat. No. 4,671,113.

[51] Int. Cl.<sup>4</sup> ............................................. G01P 15/08
[52] U.S. Cl. .............................. 73/516 LM; 73/517 R; 250/227
[58] Field of Search ............. 73/516 LM, 517 R, 653, 73/655, 657; 250/227; 356/345

[56] References Cited

U.S. PATENT DOCUMENTS

| | | | |
|---|---|---|---|
| 2,726,074 | 12/1955 | Ketchledge | 73/516 LM |
| 4,114,453 | 9/1978 | Sandler | 73/517 R |
| 4,162,397 | 7/1979 | Bucaro | 250/199 |
| 4,193,130 | 3/1980 | Young et al. | 367/149 |
| 4,297,887 | 11/1981 | Bucaro | 73/655 |
| 4,363,114 | 12/1982 | Bucaro | 367/149 |
| 4,395,908 | 8/1983 | Shopland | 73/516 LM |
| 4,408,495 | 10/1983 | Couch et al. | 73/655 |
| 4,408,829 | 10/1983 | Fitzgerald et al. | 350/96.29 |
| 4,442,350 | 4/1984 | Rashleigh | 250/227 |
| 4,534,222 | 8/1985 | Finch et al. | 73/653 |
| 4,613,752 | 9/1986 | Davis | 73/516 LM |

OTHER PUBLICATIONS

"Homodyne Demodulation Scheme for Fiber Optic Sensors Using Phase Generated Carrier" by Dandridge et al., *Journal of Quantum Electronics*, vol. QE 18, No. 10, Oct. 1982, pp. 1647–1653.

"Measured Noise Levels for a Laboratory Fiber Interferometric Hydrophone" by Cole et al., *J. Acoust. Soc. Am.* 67(6), Jun. 1980, pp. 2108–2109.

"An Introduction to Fiberoptic Sensors" by Charles M. Davis, *Laser Focus* magazine, Feb. 1982, pp. 112–115.

"High Sensitivity Fibre-Optic Accelerometer" by Kersey et al., *Electronics Letters*, vol. 18, No. 13, Jun. 1982, pp. 559–561.

"Fibre-Optic Accelerometer Designs" by Jackson et al., presented at 11th International Congress on Acoustics, Paris, Jul. 1983.

"Fiber Optic Sensors: An Overview" by Charles M. Davis, *Optical Engineering*, Mar./Apr. 1985, vol. 24, No. 2, pp. 347–351.

*Primary Examiner*—John Chapman
*Attorney, Agent, or Firm*—Fay, Sharpe, Beall, Fagan, Minnich & McKee

[57] ABSTRACT

A first optical fiber coil (A) is disposed adjacent one end of a housing (40). The housing defines an interior reservoir (44) which contains a material (B) having substantial mass, preferably a dense fluid. A second optical fiber coil (C) is mounted to the housing but isolated from pressure or force exerted by the mass material during acceleration. Phase coherent light is transmitted from the laser (10) through the two optical fiber coils. Under acceleration, the pressure or force on the first optical fiber coil causes a corresponding length change. The change in length causes a phase shift of the phase coherent light travelling the first optical fiber coil relative to the light which has travelled the second optical fiber coil. A signal processor (36) translates the phase shift into an indication of acceleration for display on an acceleration indicator (38).

14 Claims, 2 Drawing Sheets

OPTICAL FIBER ACCELEROMETER

This application is a continuation-in-part of U.S. application Ser. No. 467,264, filed Feb. 17, 1983, now U.S. Pat. No. 4,671,113.

BACKGROUND OF THE INVENTION

This invention relates to the art of accelerometers and more particularly to optical fiber accelerometers.

Heretofore, various types of accelerometers have been available. In a first type of accelerometer, a mass was displaced against a spring by the inertial force due to acceleration. The distance which the mass was displaced varied with acceleration. By monitoring the amount of displacement, the acceleration was determined. As the prior art accelerometers were redesigned to measure smaller accelerations, they tended to become more sensitive to interference. The linearity and predictability of the physical change in response to acceleration was a limiting value on the accuracy of accelerometers. When measuring small amounts of acceleration, it was generally difficult to maintain sufficient linearity and predictability.

In one prior art optical fiber accelerometer, a mass was positioned in a housing by transverse diaphragms. The mass was suspended between the ends of longitudinally extending tensioned optical fibers. The tensioned optical fibers were secured to the mass and the housing such that under a component of acceleration along the optic fibers, one fiber was elongated and the other was allowed to contract. A laser transmitted phase coherent light along each optical fiber to a mirrored end thereof and back. The acceleration caused elongation and contraction of the optical fibers, respectively, which altered the phase relationship of the reflected light. The reflected light from the mirrored ends was combined and conveyed to a signal processor or other means for measuring phase shift between the reflected light. The detected phase shift varied in accordance with the acceleration.

The present invention contemplates a new and improved accelerometer which is capable of measuring small acceleration forces accurately over a wide dynamic range.

SUMMARY OF THE INVENTION

In accordance with the present invention, an optic fiber accelerometer is provided. A first optical fiber length is mounted to have a physical property thereof altered by acceleration and a second optical fiber length is mounted such that the same physical property is unaffected by the acceleration.

In accordance with a more limited aspect of the present invention, there is provided an accelerometer which has first and second lengths of optical fiber. A mass is disposed relative to the first optical fiber length such that acceleration along a first axis subjects the first optical fiber length to a pressure or force which varies the first optical fiber length. A phase coherent light source transmits phase coherent light through the first and second optical fiber lengths. A phase detection means detects a change in the phase relationship of the phase coherent light transmitted through the two optical fiber lengths. Acceleration indicating means converts the measured phase shift into an indication of the acceleration along the first axis.

In accordance with another aspect of the present invention, an optical fiber acceleration sensor is provided. A support means supports a first optical fiber length in a first generally planar region. A mass means is connected with the support means such that accelerating the support means with a component of motion transverse to the first planar region causes a change in the pressure or force exerted on the first optical fiber length. A second optical fiber length is mounted in conjunction with the support means such that the second optical fiber length is not affected by accelerating the mass means and the support means. A phase coherent light source connecting means connects the first and second optical fiber lengths with a source of phase coherent light. A phase detection means detects changes in the phase relationship between the coherent light transmitted through the two optical fiber lengths.

A primary advantage of the present invention is that it accurately measures small accelerations. Accelerations on the order of one millionth the acceleration of gravity can be readily measured.

Another advantage of the present invention is that it is relatively insensitive to interference, particularly electrical and magnetic interference.

Yet another advantage of the present invention resides in its stable, linear response over a wide range of environmental conditions.

Still further advantages of the present invention will become apparent to those of ordinary skill in the art upon reading and understanding the following detailed description of the preferred embodiment.

BRIEF DESCRIPTION OF THE DRAWINGS

The invention may take form in various parts and arrangements of parts or in various steps and arrangements of steps. The drawings are only for purposes of illustrating a preferred embodiment and are not to be construed as limiting the invention.

DETAILED DESCRIPTION OF THE PREFERRED EMBODIMENTS

A first or acceleration sensing optical fiber length A, preferably a coil, is mounted in a material B of substantial mass density, preferably a fluid. The substantial mass material is mounted such that pressure or force therefrom shifts the phase of coherent light passing through the measuring or sensor optical fiber A in proportion to acceleration. A second or reference optical fiber length C, preferably a second coil, is mounted in association with the first optical fiber length but isolated from force and pressure attributable to the mass material.

For coherent light of wave length $\lambda$ passing through a coil of length l with an index of refraction n, the total optical phase shift $\phi$ is given by the relationship:

$$\phi = \frac{2\pi nl}{\lambda}. \tag{1}$$

Under acceleration, the mass B subjects the first optical fiber length to a pressure differential P relative to the reference optical fiber length. When both the measuring and reference optical fiber lengths have the same length l, a change in pressure P on the measuring optical fiber length causes a corresponding phase shift $\delta\phi$, i.e.:

$$\delta\phi = \frac{knl\delta P}{\lambda}, \tag{2}$$

where k is a constant which relates the phase change per meter of optical fiber to the pressure differential. It is known, for example, that for appropriately selected plastic coated optical fibers, a pressure change of 1 dyne/cm$^2$ produces a phase shift of light of 1 micron wave length on the order of $10^{-4}$ radians per meter of optical fiber. In this example, the constant k is 10 radians/m/dyne/cm$^2$.

For a fluid mass, the pressure or force differential $\delta P$ is related to an acceleration component a along an axis perpendicular to the plane of the coil, a mass density $\rho$ of the fluid material, and a height h of the fluid material operating on the first or measuring optical fiber length A, by the relationship:

$$\delta P = \rho a h \tag{3}.$$

Thus, the component of acceleration a and the phase shift $\delta\phi$ are related by:

$$\delta\phi = \frac{(knl\rho h)}{\lambda} a. \tag{4}$$

For a given optical fiber sensor in which the quantity in parentheses is a constant, the phase shift varies directly with acceleration.

By way of example, the physical properties of a sensor must be selected such that a measurable amount of phase shift, e.g. 1 microradian of phase shift, is caused by a preselected smallest measurable acceleration, e.g. 1 millionth the acceleration of gravity. This can be achieved with an optical fiber length of 10 meters, a mass density $\rho$ of one gram per cubic centimeter, an operating head h of the mass h of one centimeter and a wavelength of one micron. It is to be appreciated that the sensitivity of the accelerometer can be improved in proportion to an increase in the length of optical fiber, an increase in the density of the mass, an increase in the operating height of the mass, or a decrease in the wavelength of the coherent light.

Figure 1:
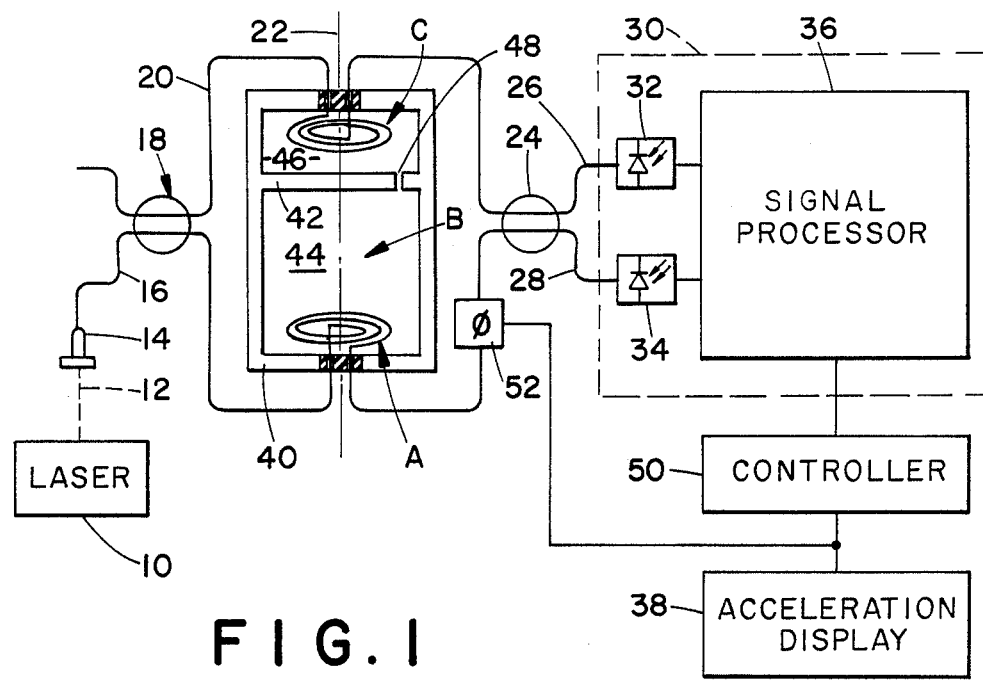
FIG. 1 illustrates an optical fiber accelerometer in accordance with the present invention.

With reference to FIG. 1, a source of phase coherent light, such as a laser 10, produces a beam of phase coherent light 12. A laser to optical fiber coupling means 14, such as a microlensed end of a length of optical fiber 16, causes the laser light to be transmitted along the optical fiber 16. An optical beam splitter 18, such as an optical fiber to optical fiber coupler, optically couples the first optical fiber 16 with a second length of optical fiber 20 such that the light is divided approximately equally between the two optical fibers. In this manner, an approximately equal amount of phase coherent light is transmitted along the first and second optical fiber lengths. The first optical fiber 16 is optically connected with the first or reference optical fiber length or coil A and the second optical fiber 20 is optically connected with the second or reference optical fiber length or coil C. In the preferred embodiment, the measuring and reference optical fiber lengths are closed-packed coils in a generally planar region that is transverse to the axis 22 along with acceleration is measured. Alternately, the measuring and reference optical fiber lengths may be arranged in other patterns which enable a relatively long length of optical fiber to be positioned in a relatively small, generally planar region.

A second optical fiber to optical fiber coupling means 24 combines the light from the sensor coil A and the reference coil C. The light from the first or sensor coil is phase shifted relative to the light from the second or reference coil in proportion to the acceleration component as described above. Combining the phase shifted phase coherent beams of light in the two optical fibers produces an optical interference which affects the intensity of the combined, modulated light. A pair of output optical fibers 26, 28 carry the combined, modulated light from a light combining means 24 to a phase detector 30 for detecting shifts in the phase relationship of the phase coherent light transmitted through the measuring and reference optical fibers. The phase detection means includes a pair of photodiodes or other photodetectors 32, 34 which sense the light transmitted to the output optical fibers and produce corresponding electrical signals. Electrical signals are processed by a signal processor 36 which detects the phase related changes in the electrical signals to provide an indication of acceleration along the axis 22 for a display means 38.

The first optical fiber length A is positioned in a plane transverse to the acceleration sensing axis 22 and adjacent one end of a housing 40. A partition 42 divides the housing 40 into a sensing coil reservoir or chamber 44 and a reference coil region or chamber 46. In this manner, the partition isolates the reference coil C from the mass means B. A very small bleeder hole 48 may be provided to equalize the static pressure between chambers 44 and 46. The reference coil is subject to substantially the same climatic conditions, such as temperature, to assure that alterations in the length and other characteristics of the sensing coil A are attributable only to the acceleration related pressure or force difference.

The signal processor 36 may provide a direct indication of the acceleration from the measured phase shift. Alternately, a controller 50 may adjust a phase modulator or shifter 52 on one of the first and second fiber lengths. The controller under the direction of the signal processor causes the modulator to alter the shift phase of the corresponding signal until the phase coherent light from the two optic fiber lengths returns to a preselected starting phase relationship. The amount of phase shift required by the modulator 52 to return coherent light signals to the preselected phase relationship is equal to the phase shift. Hence, the controlled phase shift may be converted to a display for the acceleration indicator 38.

Figure 2:
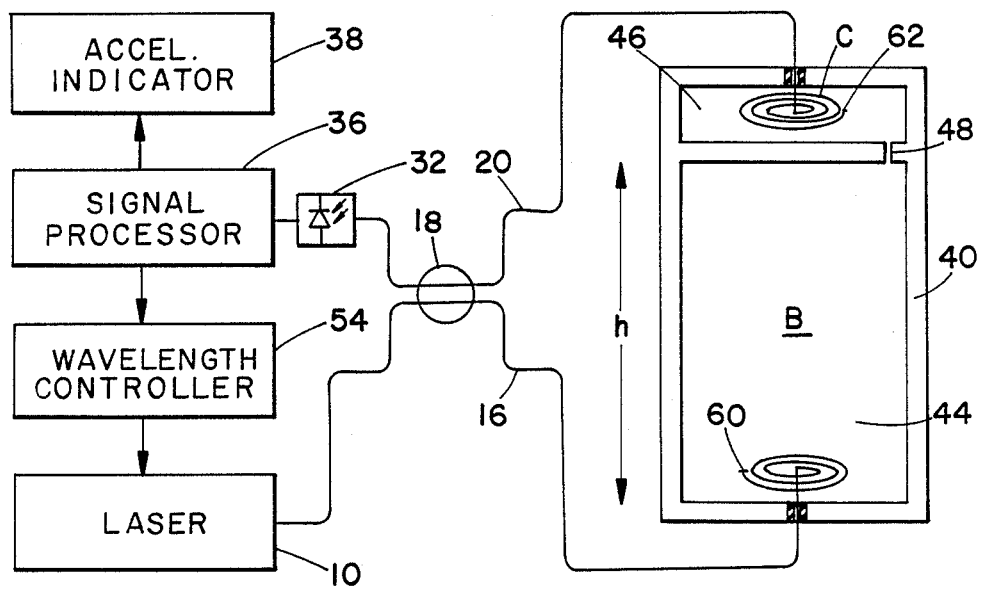
FIG. 2 illustrates an alternate embodiment of the accelerometer.

With reference to the embodiment of FIG. 2, phase coherent light from the laser 10 is split by a fiber optic coupler 18 between first and second optical fibers 16, 20. The light travels through the sensing coil A to a mirrored or reflective end 60 thereof and returns to the optic coupler 18. Similarly, the light passing along the second optical fiber 20 passes through the reference fiber optic coils C to a reflective end 62 thereof and returns through the reference coil to the optic coupler 18. The optic coupling means 18 combines the reflected light from the sensing and reference coils to provide the photodetector 32 with a modulated light input. The intensity of the modulated light changes with the relative phase of the two returned light signals in a known manner. The light intensity changes as monitored by the photodetector 32 are translated by the signal processor 36 into an indication of the acceleration which is displayed on the acceleration display indicator 38. The signal processor 36 may, for example, count the number of light and dark reversals in the interference pattern as the housing 40 is accelerated. Alternately, the signal processor may control a laser wavelength control means 54 which varies the laser drive current, hence the laser wavelength. The laser wavelength is varied in a preselected manner such that the acceleration induced optical phase shifts are converted by the signal processor using heterodyne or other available techniques into an indication of the accelerator on the display indicator 38.

Figure 3:
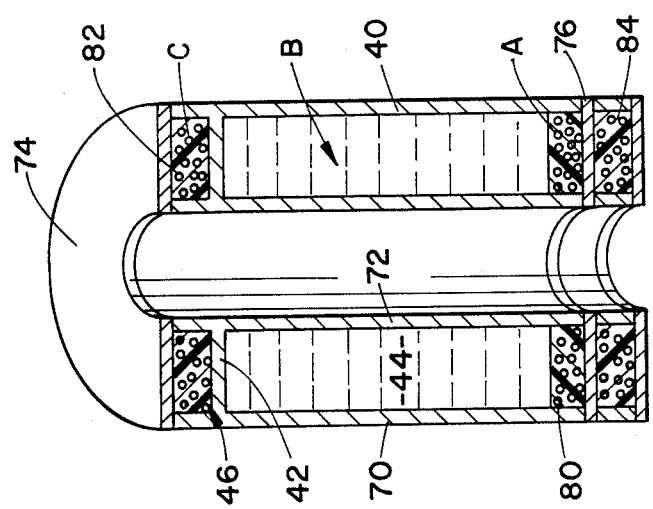
FIG. 3 is a detailed illustration of one embodiment of an acceleration sensing module.

With reference to FIG. 3, the housing 40 is generally annular. It is defined by an outer cylindrical wall 70 and an inner cylindrical wall 72. The partition or barrier 42 is a rigid annular wall which divides the housing into the mass material receiving region or reservoir 44 and the isolated reference coil receiving region 46. A top plate 74 and a lower annular plate 76 close the reference and sensing coil receiving regions, respectively. The sensing coil A is potted in a polymeric acousto-optic coupling material 80, such as Teflon or polyurethane, which transmits changes in force and pressure to the optic fiber coil. The reference coil C is potted in a polymeric material 82 which substantially fills the isolated region between the barrier 42 and the top plate 74. The reference coil may be potted in a relatively incompressible potting material or the same potting material as the sensing coil.

Optionally, a second isolated chamber 84 may be defined opposite the lower wall 76 and the reference coil C may be positioned half in the isolated region 46 and half in the isolated region 84. The total length of the two reference coil halves equals the length of the sensing coil. Preferably, the two halves of the reference coil are interconnected such that any minute elongation or physical property change attributable to forces or pressure transmitted through the partition 42 and bottom plate 76 or attributable to the potting materials cancels. In the preferred embodiment, the mass means B is mercury which fills the reservoir 44. Alternately, other mass means such as a ring of lead which is slidably received in the reservoir 44, dense metal pellets, and the like may be utilized to exert pressure on the sensing coil A.

Figure 4:
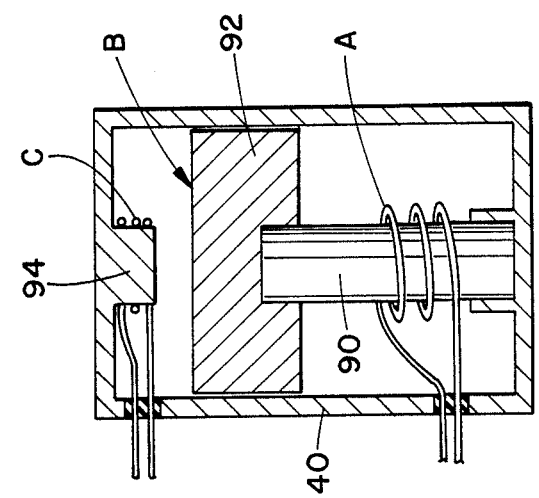
FIG. 4 illustrates an alternate embodiment of the acceleration sensing module; and, FIG. 5 illustrates yet another alternate embodiment of the optical fiber sensing module.

With reference to the embodiment of FIG. 4, the housing 40 defines a mounting receptacle for mounting a pressure expansible cylinder 90 such as a rubber or elastomeric cylinder. The mass material B, such as block 92 of dense metal, is supported at one end of the elastomeric cylinder. During acceleration, the force of the mass material compresses or elongates the elastomeric cylinder 90 which expands or contracts its diameter. The diameter expansion and contraction elongates or permits contraction of the sensing coil A which is wrapped peripherally therearound. The housing 40 defines a mounting stud or projection 94 which is isolated from pressure or pressure related deformation caused by the mass member B. The reference coil C is wrapped peripherally around the mounting projection 94 with the same diameter, length, and orientation as the sensing coil.

Figure 5:
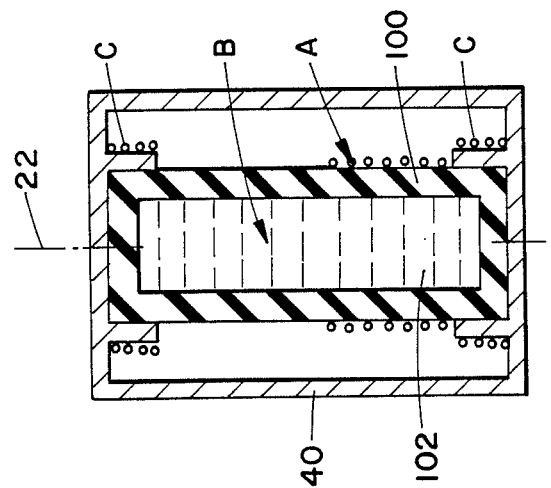

In the embodiment of FIG. 5, the housing 40 defines mounting members which support a hollow, cylindrical resilient member 100 therein. The resilient member defines a reservoir or region 102 which contains the mass material B, preferably fluid. The sensing coil A is wrapped around the periphery of one end of the elastomeric cylinder 100 such that under acceleration, expansive and contractive forces are exerted thereon. The reference coil C is mounted to the upper and lower rigid mounting flanges of the housing which are pressure insulated from the elastomeric member. In this manner, the reference coil is not subject to deformation by the mass means during acceleration.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiments, the invention is now claimed to be:

1. An accelerometer for measuring acceleration along a first axis, the accelerometer comprising:
    a first length of optical fiber including a first coil disposed in a closed-packed pattern;
    a mass means operatively connected with the first optical fiber length for applying a force or pressure to the first optical fiber length coil which varies the first optical fiber length by an acceleration related differential during acceleration;
    a second length of optical fiber including a second coil disposed in a closed-packed pattern mounted adjacent the first optical fiber length coil to be subject to analogous environment conditions with the first optical fiber length coil;
    a phase coherent light source for transmitting phase coherent light through the first and second optical fiber lengths, the phase coherent light source being operatively connected with the first and second optical fiber lengths;
    a phase coherent detection means for detecting a change in the phase relationship of phase coherent light transmitted through the first and second optical fiber lengths, the phase detection means being operatively connected with the first and second optical fiber lengths; and,
    an acceleration indicating means for converting the detected phase shift into an indication of the acceleration, the acceleration indicating means being operatively connected with the phase detection means.

2. The accelerometer as set forth in claim 1 wherein the phase detection means includes:
    a combining means for combining the phase coherent light transmitted through the first and second optical fiber lengths, such that interference is produced in the intensity of the combined light;
    a photodetection means for producing electrical signals which vary with changes in the intensity of the combined light, the photodetection means being operatively connected with the combining means;
    a signal processing means for processing the electrical signals from the photodetection means to produce an output signal which is proportional to the acceleration, the signal processing means being operatively connected with the photodetection means; and, wherein the acceleration indicating means converts the output signal from the signal processor to the indication of acceleration.

3. The accelerometer as set forth in claim 1 further including a housing, the first optical fiber length being disposed generally adjacent one end of the housing and the mass being disposed in the housing adjacent the first optical fiber length to exert the force differential thereon during the acceleration.

4. The accelerometer as set forth in claim 1 wherein the first and second optical fiber lengths each have a mirrored end such that light transmitted therethrough is reflected, the phase coherent light source and the phase detection means being operatively connected with the other end of the first and second optical fiber lengths.

5. The accelerometer as set forth in claim 1 further including a phase modulator means disposed along one of the first and second optical fiber lengths for selectively adjusting the phase of the phase coherent light transmitted therethrough.

6. An accelerometer for measuring acceleration along a first axis, the accelerometer comprising:
a first length of optical fiber;
a fluid operatively connected with the first optical fiber length for applying a force or pressure to the first optical fiber length which varies the first optical fiber length by an acceleration related differential during acceleration;
a second length of optical fiber mounted adjacent the first optical fiber length to be subject to analogous environment conditions with the first optical fiber length;
a phase coherent light source for transmitting phase coherent light through the first and second optical fiber lengths, the phase coherent light source being operatively connected with the first and second optical fiber lengths;
a phase coherent detection means for detecting a change in the phase relationship of phase coherent light transmitted through the first and second optical fiber lengths, the phase detection means being operatively connected with the first and second optical fiber lengths; and,
an acceleration indicating means for converting the detected phase shift into an indication of the acceleration, the acceleration indicating means being operatively connected with the phase detection means.

7. An accelerometer for measuring acceleration along a first axis, the accelerometer comprising:
a first optical fiber length potted in an acousto-optic coupling medium;
a mass means operatively connected with the first optical fiber length for applying a force or pressure to the first optical fiber length which varies the first optical fiber length by an acceleration related differential during acceleration;
a second length of optical fiber mounted adjacent the first optical fiber length to be subject to analogous environment conditions with the first optical fiber length;
a phase coherent light source for transmitting phase coherent light through the first and second optical fiber lengths, the phase coherent light source being operatively connected with the first and second optical fiber lengths;
a phase coherent detection means for detecting a change in the phase relationship of phase coherent light transmitted through the first and second optical fiber lengths, the phase detection means being operatively connected with the first and second optical fiber lengths; and,
an acceleration indicating means for converting the detected phase shift into an indication of the acceleration, the acceleration indicating means being operatively connected with the phase detection means.

8. The accelerometer as set forth in claim 7 wherein the acousto-optic coupling medium includes a polymeric material.

9. An accelerometer for measuring acceleration along a first axis, the accelerometer comprising:
a housing:
an elastomeric cylinder mounted within the housing having a longitudinal axis generally along the fist axis and having a periphery displaced from the housing, the elastomeric cylinder defining a reservoir therein;
a fluid disposed in the elastomeric cylinder reservoir;
a first optical fiber length wound peripherally around the elastomeric cylinder adjacent one end thereof;
a second optical fiber length mounted within the housing;
a phase coherent light source for transmitting phase coherent light through the first and second optical fiber lengths, the phase coherent light source being operatively connected with the first and second optical fiber length;
a phase detection means for detecting a change in the phase relationship of phase coherent light transmitted through the first and second optical fiber lengths, the phase detection means being operatively connected with the first and second optical fiber lengths; and,
an acceleration indicating means for converting the detected phase shift into an indication of the acceleration along the first axis, the acceleration indicating means being operatively connected with the phase detection means.

10. A fiber optic acceleration sensor comprising:
a first optical fiber length disposed in a first generally planar region;
a second optical fiber length;
a support means for supporting the first and second optical fiber lengths;
a mass means operatively connected with the support means such that accelerating the mass means with a component of motion transverse to the first planar region in a first direction causes an increase in pressure exerted on only the first of the optical fiber lengths by the mass means;
a phase coherent light source connecting means for connecting the first and second optical fiber lengths with a source of phase coherent light; and,
a phase detection means for detecting changes in a phase relationship between the phase coherent light transmitted through the first and second lengths.

11. The acceleration sensor as set forth in claim 10 further including a housing defining a reservoir therein, the first optical fiber length being mounted by the supporting means in the reservoir adjacent one end of the housing and the mass means being disposed in the housing reservoir.

12. The acceleration sensor as set forth in claim 11 wherein at least the first optical fiber length is potted in an acousto-optic coupling medium.

13. A method of measuring acceleration along a preselected direction, the method comprising:
   transmitting a first beam of phase coherent light from a phase coherent light source along a first light path which is transverse to the preselected direction;
   accelerating the first phase coherent light path along the preselected direction such that the first phase coherent light path is elongated with an elongation that is related to the acceleration;
   transmitting phase coherent light from the phase coherent light source along a second path which is subject to analogous relatively static environmental conditions as the first light path to provide a reference path;
   determining a change in the phase relationship of the phase coherent light which has traversed the first and second phase coherent light paths, the phase change being related to the acceleration along the preselected direction; and,
   converting the detected change in the phase relationship into an indication of acceleration.

14. A fiber optic acceleration sensor comprising:
   a first optical fiber length disposed in a first region;
   a support means for supporting the first optical fiber length;
   means for constraining a fluid mass in operative connection with the first optic fiber length such that accelerating the fluid with a first component of motion causes a change in pressure exerted by the fluid on the first optical fiber length;
   a reference optic fiber length supported by the support means adjacent but displaced from the first fiber optic length;
   a phase coherent light source connecting means for connecting the first and reference optical fiber lengths to a source of phase coherent light; and,
   a phase detection means for detecting changes in a phase relationship between the phase coherent light transmitted through the first and reference lengths.

* * * * *